Oct. 20, 1953
R. E. LIZENBEE
2,655,861
WEED DEFLECTOR AND TYING WIRE GUIDE FOR BALING PRESSES
Filed July 29, 1952
2 Sheets-Sheet 1
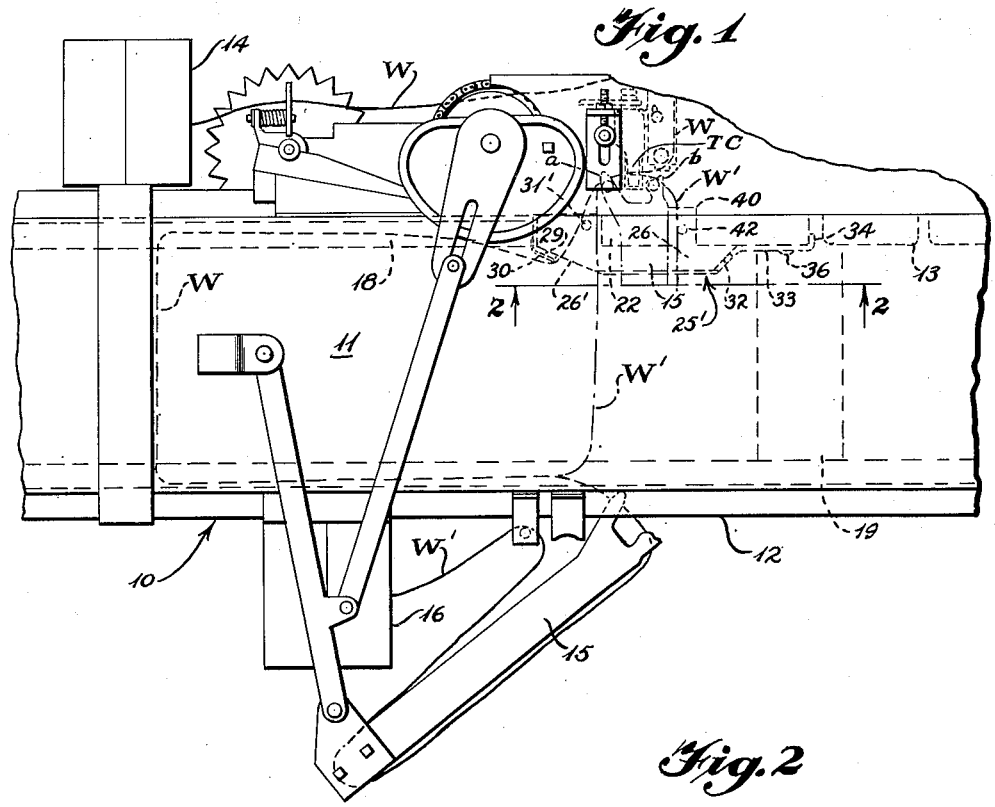
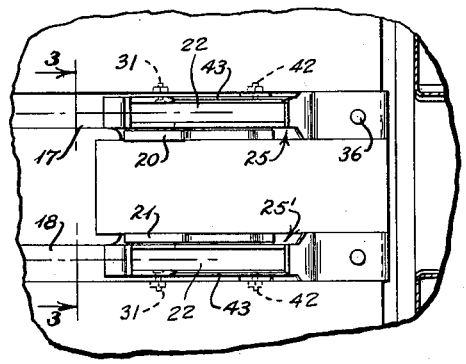
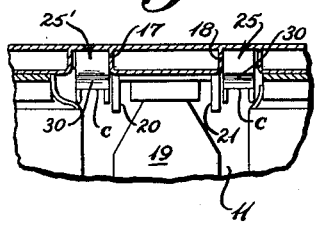
Inventor
*Randel Earl Lizenbee*
By Beale and Jones
Attorneys Oct. 20, 1953 R. E. LIZENBEE 2,655,861
WEED DEFLECTOR AND TYING WIRE GUIDE FOR BALING PRESSES
Filed July 29, 1952 2 Sheets-Sheet 2
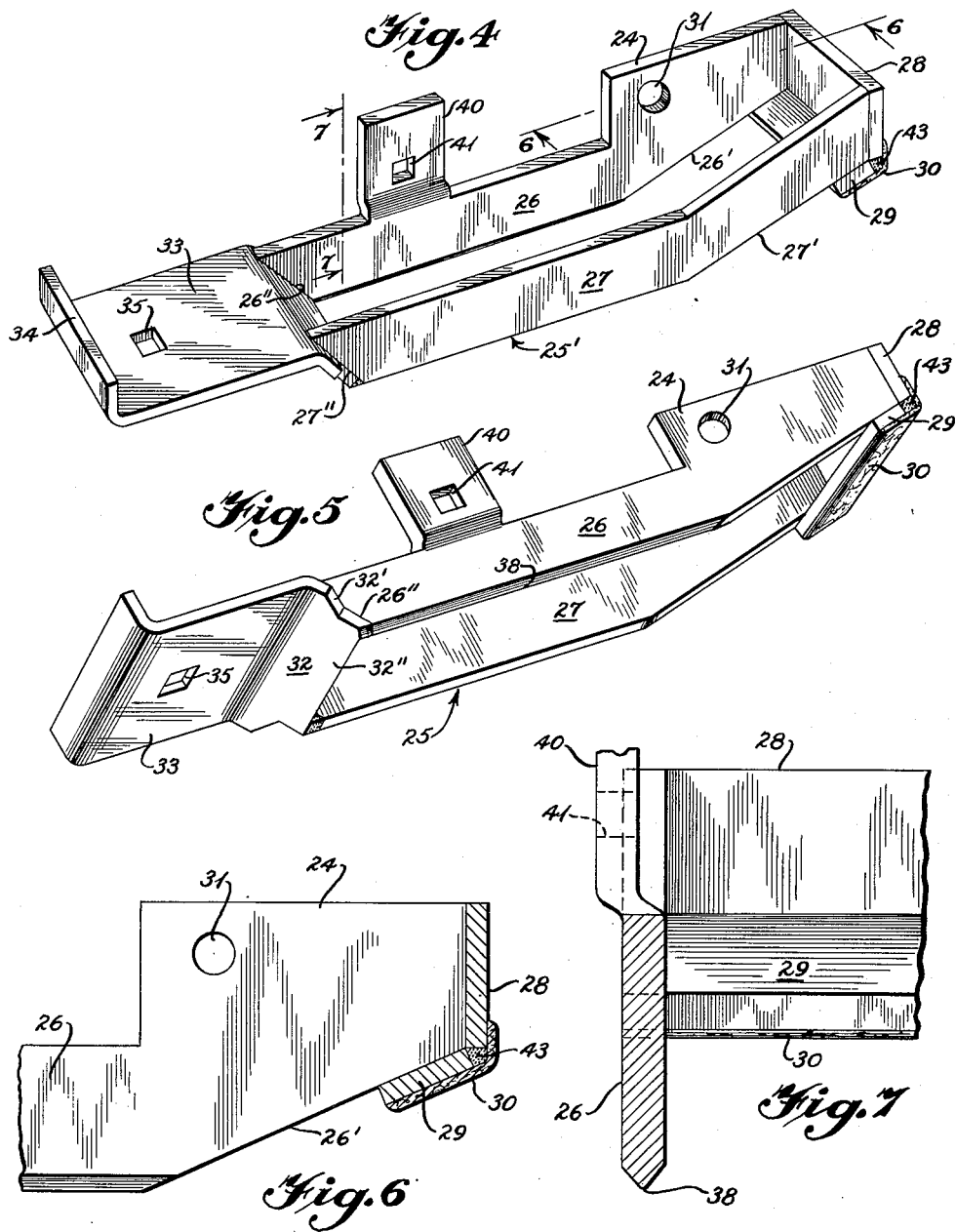
Inventor
*Randel Earl Lizenbee*
By Beale and Jones
Attorneys Patented Oct. 20, 1953

2,655,861

UNITED STATES PATENT OFFICE 2,655,861

WEED DEFLECTOR AND TYING WIRE GUIDE
FOR BALING PRESSES

Randel Earl Lizenbee, Advance, Mo.

Application July 29, 1952, Serial No. 301,540

7 Claims. (Cl. 100—19)

My invention relates generally to automatic baling presses in which a baling chamber is provided with wire guide channels, a baling wire twisting and cutting mechanism, and a wire feeding needle and, more particularly, to a combined weed deflector and tying wire guide that is mounted in the wire guide channel adjacent the wire twisting and cutting mechanism.

The type of baling press to which my combined weed deflector and tying wire guide is attached is such as is disclosed in the M. T. Tuft U. S. Patent 2,512,754, issued June 27, 1950, and the G. B. Hill et al. U. S. Patent 2,512,896, issued June 27, 1950.

The primary object of my invention is to provide a combined weed deflector and tying wire guide which may be mounted in the tying wire guide channel adjacent each of the tying wire twister and cutting mechanisms in baling presses as referred to above.

A still further object of my invention is to provide a structure which may be mounted in the tying wire guide channels in the baling press chamber and adjacent the tying wire twisting and cutting mechanism so that weeds and the material being baled will be deflected away from the tying mechanism and at the same time the tying wire will be guided so as to be in a taut condition and in position to be thrust into the slotted twisting gear along with the tying wire carried by the needle.

A still further object of my invention is to provide a tying wire guide which holds the upper tying wire in such a baling press out of engagement with the slotted twisting gear except when the needle carrying the second wire thrusts the two wires into the slotted twisting gear and cutting mechanism.

A still further object of my invention is to provide a combined weed deflector and tying wire guide which comprises a pair of vertically extending elongated side members spaced apart with transverse connecting end members which when mounted in a tying wire guide channel in a baling press extends below the edge of the channel so as to deflect the material being baled away from the twisting and cutting mechanism to prevent the same from becoming fouled.

Another object of my invention is to provide a combined weed deflector and tying wire guide which may be easily installed on existing baling presses of the type above referred to which will not interfere with the needle operation and yet will prevent the material being baled from becoming engaged in the wire twisting and cutting mechanism and at the same time holds the upper tying wire out of engagement with the slotted gear except for a wire twisting and cutting operation and thus reduces the wear on the slotted twisting gear.

A still further object of my invention is to provide for a combined weed deflector and tying wire guide which will not only deflect the material being baled away from the wire tying and cutting mechanism but which also holds the upper tying wire in such a baling press in a taut condition to provide for a tighter twisted wire joint.

Still further objects and the entire scope of applicability of the present invention will become apparent from the detailed description given hereinafter; it should be understood, however, that the detailed description and specific example is given by way of illustration only and, while indicating the preferred embodiment of the invention, is not given by way of limitation, since various changes and modifications within the spirit and scope of the invention will become apparent to those skilled in the art from this detailed description.

For a more detailed description, but not in a limiting sense, reference may be had to the following drawings in which;

Figure 1 is a fragmentary rear elevation view of a baling press showing the baling chamber, the needle in a withdrawn and an inserted position and the position of the weed deflector and wire tying guide as mounted on the baling press with respect to the inserted position of the needle;

Figure 2 is a fragmentary bottom plan view taken along section lines 2—2 in Figure 1 showing a pair of my combined weed deflectors and wire guides installed in the wire guide channels;

Figure 3 is an elevational view taken along sectioned lines 3—3 of Figure 2 showing the ends of the deflectors and the guides according to my invention;

Figure 4 is a perspective view of a rear combined weed deflector and tying wire guide as it would appear in its upright position to be installed in a baling press;

Figure 5 is a further perspective view of a front combined weed deflector and tying wire guide similar to Figure 4 but tipped up along and resting on one of the elongated vertically disposed side walls;

Figure 6 is a fragmentary sectional view taken along section lines 6—6 of Figure 4 showing an apertured attaching ear on one of the sides of my deflector; and Figure 7 is a fragmentary sectional view along section line 7—7 of Figure 4 showing an attaching lug extending upward from and offset from one of the elongated sides of the deflector.

Throughout the figures of the drawings and the description like reference numerals refer to similar parts.

Referring to Figure 1, there is illustrated a figure similar to Fig. 1 of the above referred to G. B. Hill et al. U. S. Patent 2,512,896, issued June 27, 1950, showing a fragmentary portion of the baling chamber of an automatic baling mechanism. This fragmentary baling chamber and the associated mechanism is generally indicated at 10. The baling chamber proper is indicated at 11 and the usual bottom and top longitudinal support members 12 and 13 are illustrated. A wire box for the upper wire is indicated at 14 and the upper wire fed therefrom is indicated at W while the lower wire W' is fed by the needle 15 from the bottom box 16. The tying wire twisting gear T is located just above the baling chamber 11 and protrudes between the ears $a$ and $b$ on the upper end of the needle 15. The tying wire cutting mechanism C is also mounted adjacent such a twister gear.

Referring to Figures 2 and 3 a pair of wire guide channels 17 and 18 extend into the top portion of the baling chamber 11. The end of the baling plunger 19 is shown in Figure 3 and the hay dogs 20 and 21 are shown in retracted position in the upper portion of the baling chamber 11. In operation the plunger 19 forces the hay or other material to be baled from the right-hand end of Figure 1 into the baling chamber 11 against the encircling tying wire W and W' which have been previously twisted together to form a composite wire and cut at the twisted joint after the completion of tying a bale. The dogs 20 and 20' move down into the baling chamber 11 as the plunger 19 is retracted so as to hold the compressed hay from moving out of the baling chamber. Some of the hay or material being baled tends to move to the right as shown in Figure 1 even though the dogs 20 and 20' are in operative holding position and this material becomes engaged within the passageway for the needle 15 as indicated at 22, see Figure 1, and has a tendency to extend on up into the twister mechanism T positioned above the needle passageway 22. So also when the hay and material being baled moves from the right, see Figure 1, towards the left ahead of the plunger 19 there is a tendency for the hay to become engaged within the passageway 22 and extend up into the twisting mechanism. In order to overcome these difficulties and prevent hay, weeds and sticks from becoming fouled in the twisting mechanism I have provided a novel structure which I have termed a combined weed deflector and tying wire guide which is generally indicated at 25' in Figure 4 for the rear one of these deflectors and at 25 in Figure 5 for the front deflector. So also these deflectors are shown installed in Figures 1, 2 and 3, in their respective positions. The difference between the deflectors is in the attaching lugs and apertured outer side portions to be described. The deflector 25' shown in Figure 1 is adapted to be mounted in the rear wire guide channel of the baling press shown in Figure 1 while its companion deflector 25 shown in Figure 4 is adapted to be mounted in the front wire guide channel of the press in Figure 1.

The combined deflector and guide 25' which is fabricated from the suitable steel stock and shown in Figure 4 will now be described. A pair of vertically disposed elongated spaced side members 26 and 27 have their ends at 26' and 27' particularly along their lower edges inclined gradually upward toward the ends where they terminate and are joined together by a transverse first end member 28 which is attached as by welding in a well known manner. A second transverse member 29 is attached to each of the extreme ends of the lower edges 26' and 27' of the sides 26 and 27 and adjacent the first transverse end member 28. A facing or shoe 30 of hardened material such as "Stoodite" is attached about the lower portion of the end member 28 and over the transverse second member 29 to provide a wear resistant surface for the tying guide wire which passes thereover. In the embodiment of the device shown in Figure 4 side member 26 is provided with an upstanding flange portion 24 opposite to the inclined edge 26' and is provided with an aperture 31 therethrough for receiving a bolt or rivet 31' as shown in Figure 1 for attaching the deflector and guide 25' to the baling press structure. The other or second end of the side members 26 and 27 as indicated at 26'' and 27'' extend upwardly from the bottom edge to the top edge and towards the remote ends of the side members 26 and 27. A third transverse end member 32 is attached as by welding to the ends 26'' and 27'' of the sides 26 and 27 and this third end portion 32 slants upwardly and to the rear. The end portion 32 has an attached or integrally formed horizontal extending portion 33 at its upper end which is in alignment with the top edges of the side members 26 and 27 while the extreme end of the horizontal portion 33 is provided with upturned flange 34 which provides for stabilizing the deflector and guide 25' in the installed position as shown in Figure 1. Horizontal portion 33 is provided with an aperture 35 for receiving a rivet or a bolt 36; see Fig. 1, which secures the horizontal end portion to the baling press structure. The end portion 32, the horizontal portion 33 and the upstanding flange 34 are slightly wider than and extend to each side of the side members 26 and 27. Side members 26 and 27 are spaced apart so as to fit within the wire guide channels 17 and 18 as best shown in Figures 2 and 3. The end portion 32 is narrowed down as indicated at 32' so that the lower portion 32'' thereof is of the same width as the overall spacing of the sides 26 and 27 as measured from the outside to outside. Each combined weed deflector and tying wire guide structure 25 and 25' is made of steel stock which may be easily welded and fabricated. As an additional securing feature I provide the outside side member as indicated at 26 in each of Figures 4 and 5 in the two embodiments of the deflector and guide 25 and 25' with an upstanding securing lug 40 which is offset outward as shown in Figure 7 and in an opposite direction to the opposite side 27. This upstanding lug is apertured as at 41 so as to receive a mounting bolt or rivet 42 to secure it to the adjacent channel framework of the baling press structure as best shown in Figure 2. It will be noted in Figures 1 and 3 that the side members 26 and 27 protrude below the tying wire guide channels 17 and 18, as indicated at $c$ a distance equal to nearly the depth of the wire guide channels. This downward protrusion of the side members 26 and 27 serves to deflect the hay and material being baled downward and away from the needle passageway 22, see Figure 1, and away from the wire twisting and cutting mechanism. Thus, referring to Figure 1, the hay tends to move down the slanting ramp-like portion or end portion 32 and along the bottom edges of the side members 26 and 27 and then on up the inclined portions 26' and 27' on the side portions 26 and 27 thence into the baling chamber 11.

Referring to Figure 6, the upstanding flange portion 24 is shown attached to the side 26 and it is apertured as at 31. The first end portion 28 and the second end portion 29 are shown attached to the side 26 and suitable welding at the juncture of transverse cross pieces 28 and 29 is shown at 43. The shoe 30 is shown extending over the lower edge portion of the end 28 and the cross end portion 29. This shoe 30 is wear-resistant and is of material such as "Stoodite" which resists friction wearing by the tying guide wire which passes thereover as shown in Figure 1 in operative position.

In Figure 7 the offset lug 40 is shown with its aperture 41 extending upwardly from the top edge of the side member 26.

Referring again to Figure 5 the side member 26 is shown with its extreme bottom edge provided with a downwardly extending V-shaped in cross section portion 38 which permits the needle 15 to readily slide thereby as it oscillates into and out of the needle passage 22. This V-shaped cross section lower edge of the side member 26 is also shown in Figure 2.

The combined weed deflector and tying wire guide according to my invention is easily installed on baling presses of the type referred to in the forepart of this description. It will be noted by reference to Figure 1 that the wire W is led over the shoe or facing 30 which hold the wire down out of the tying wire guide channel and out of the twister gear slot T except when the needle 15 feeds wires W and W' into the twister gear and cutting mechanism. Thus, the wire W does not slide in the twister gear slot and cause excessive wear on the twister gear. The tying wire guide portion at 28, 29 and 30 on the end of the deflector 25' hold the wire W down out of the tying wire guide channel 18 and also applies a tension on the wire which greatly assists in tying a tighter wire joint between wire W and W' at each periodic tying operation.

My combined weed deflector and tying wire guide is economical to manufacture, relatively easy to install and has been of great assistance in overcoming two particular problems in these types of baling presses as referred to hereinabove.

I claim as my invention:

1. In a baling press having a baling chamber provided with recessed tying wire guide channels extending into the top and bottom walls thereof, said baling chamber having a head and a wire box end, a wire twister and cutter mechanism positioned above each of said recessed tying wire guide channels, said guide channels having a needle passageway therethrough in alignment below said twister and cutter mechanism and a needle member movable through said aligned passageways to a position adjacent said twister and cutter mechanism whereby tying wire extending in the upper wire guide channels is periodically moved into said twister and cutter mechanism by said needle, the improvement consisting of a combined weed deflector and tying wire guide adapted to be mounted in each upper wire guide channel adjacent said twister and cutter mechanism and said needle passageways therethrough comprising, a pair of vertically disposed spaced apart side members mounted in each guide channel and extending in the same direction therewith and protruding below said channel a relatively small distance into said baling chamber providing a needle passageway therebetween and the protruding portions guiding the material to be baled away from said twister and cutter mechanism, the lower edges of said side members at the end projecting into said baling chamber toward the wire box end of the baling chamber being gradually inclined upwardly, a transverse cross member connecting said side members at said first end thereof and having a transverse shoe portion against which the tying wire slides in spaced relationship below said upper wire guide channel, the opposite ends of said side members being inclined upwardly from the bottom edge to the top edge thereof, a second transverse cross member connecting said opposite ends inclining upwardly and toward and affixed to a horizontally extending plate member in alignment with the upper edges of said spaced apart vertical members, said horizontally extending plate being apertured to receive fastening means for attaching it to said baling chamber, one of said vertically extending side members having an aperture therethrough adjacent said first end to receive a securing bolt to secure the combined deflector and wire guide to the baling case.

2. A device of the character described in claim 1 wherein said vertically extending side member of the combined weed deflector and tying wire guide having the aperture therein is further provided with an apertured lug member which extends upwardly from the top edge thereof intermediate the ends of said member and is off-set to the side opposite from said other side member and is adapted to be secured to said baling chamber by a bolt passed through said aperture.

3. A device of the character described in claim 2 wherein said apertured horizontal extending plate adjacent one end of said side members has an upturned transversely extending flange at the outer end thereof which assists the stable mounting of said combined weed deflector and tying wire guide and acts with said horizontal plate member and said second transverse plate on the ends of said side members to deflect the material being baled downward and away from said wire twister and cutter mechanism.

4. A device of the character described in claim 3 including a friction wear resisting wire guide shoe mounted over the lower exposed portion of said first transverse member and extends across the lower edges of the said side members at the adjacent end thereof whereby tying wire sliding over the end of the weed deflector and wire guide has a less tendency to wear away that end of the deflector and wire guide.

5. A combined weed deflector and wire guide for the tying wire guide channel and tying wire twister and cutter mechanism of a baling press comprising a pair of vertically disposed spaced apart elongated members adapted to be mounted adjacent the side walls of a wire guide channel and protrude downwardly beyond the lower portions of said walls, said elongated side members having their bottom edges adjacent a first end extending upwardly at a gradual incline to the end of the members which extend substantially vertical, one of said members adjacent said first end having an upwardly extending lug portion that is apertured to receive a mounting bolt, a first transverse member connecting said first ends which extend substantially vertical, a transverse shoe member fixed to the inclined lower edges of said side members proximal to said first transverse member and adapted to guide a tying wire positioned thereagainst, the second end of said side members being inclined upwardly toward that second end from the bottom edge to the top edge thereof, and a third transverse member connecting said second ends of the side members and having an outwardly extending portion extending in a substantially horizontal direction beyond said second ends of the side members and in alignment with the top edges thereof, said horizontally extending portion of the third transverse member having an upwardly extending flange at the extreme end thereof, and said horizontal portion of the third member being apertured to receive a securing bolt.

6. A combined weed deflector and wire guide according to claim 5 wherein said lug on one of said side members is off-set outwardly and opposite from said other side member.

7. A combined weed deflector and wire guide according to claim 6 wherein said side member having the aperture therein and the attached lug has its lower edge extending downwardly and terminating in a portion having a V-shaped cross section.

RANDEL EARL LIZENBEE.

References Cited in the file of this patent

UNITED STATES PATENTS

| Number | Name | Date |
|---|---|---|
| 429,240 | Jackson | June 3, 1890 |
| 1,205,980 | Dudley | Nov. 28, 1916 |
| 2,575,538 | Tuft | Nov. 20, 1951 |